(12) United States Patent
Kang

(10) Patent No.: US 7,391,741 B2
(45) Date of Patent: Jun. 24, 2008

(54) LINK STATE SYNCHRONIZATION METHOD AND APPARATUS ON AD-HOC NETWORK, AND DATA STRUCTURE THEREFOR

(75) Inventor: Mun-hyuk Kang, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 878 days.

(21) Appl. No.: 10/355,111

(22) Filed: Jan. 31, 2003

(65) Prior Publication Data

US 2004/0028060 A1 Feb. 12, 2004

(30) Foreign Application Priority Data

Aug. 8, 2002 (KR) ............. 10-2002-0046807

(51) Int. Cl.
*H04L 12/28* (2006.01)
(52) U.S. Cl. .................................... 370/254
(58) Field of Classification Search .......... 370/252, 370/329, 351, 389, 400, 401, 408, 334, 253, 370/254; 455/428, 445; 709/238
See application file for complete search history.

(56) References Cited

U.S. PATENT DOCUMENTS

| | | | | |
|---|---|---|---|---|
| 4,864,559 A | * | 9/1989 | Perlman | 370/256 |
| 5,339,316 A | * | 8/1994 | Diepstraten | 370/401 |
| 6,144,669 A | * | 11/2000 | Williams et al. | 370/401 |
| 6,456,599 B1 | * | 9/2002 | Elliott | 370/254 |
| 6,775,709 B1 | * | 8/2004 | Elliott | 709/238 |
| 6,928,061 B1 | * | 8/2005 | Garcia-Luna-Aceves et al. | 370/329 |
| 6,961,575 B2 | * | 11/2005 | Stanforth | 455/445 |
| 2003/0179742 A1 | * | 9/2003 | Ogier et al. | 370/351 |

* cited by examiner

*Primary Examiner*—Ricky Q. Ngo
*Assistant Examiner*—Pao Sinkantarakorn
(74) *Attorney, Agent, or Firm*—Sughrue Mion, PLLC

(57) ABSTRACT

A link-state synchronization method on an ad-hoc network includes the steps of each node broadcasting link state information indicating the state of a link connected directly to the node, to a neighboring node; and the neighboring node receiving the link state information, storing the received link state information and broadcasting the link state information to another neighboring node. According to the link state synchronization method, the link state can be quickly synchronized without overhead.

4 Claims, 18 Drawing Sheets

| PACKET TYPES | PACKET NAMES |
|---|---|
| HELLO PACKET | FLOOD_PK_TYPE_HELLO |
| HELLO RESPONSE PACKET | FLOOD_PK_TYPE_HELLO_RESP |
| LINK STATE PACKET | FLOOD_PK_TYPE_LINK_STATE |
| SYNCHRONIZATION PACKET | FLOOD_PK_TYPE_SYNC |
| SYNCHRONIZATION RESPONSE PACKET | FLOOD_PK_TYPE_SYNC_RESP |
| DATA PACKET | FLOOD_PK_TYPE_DATA |

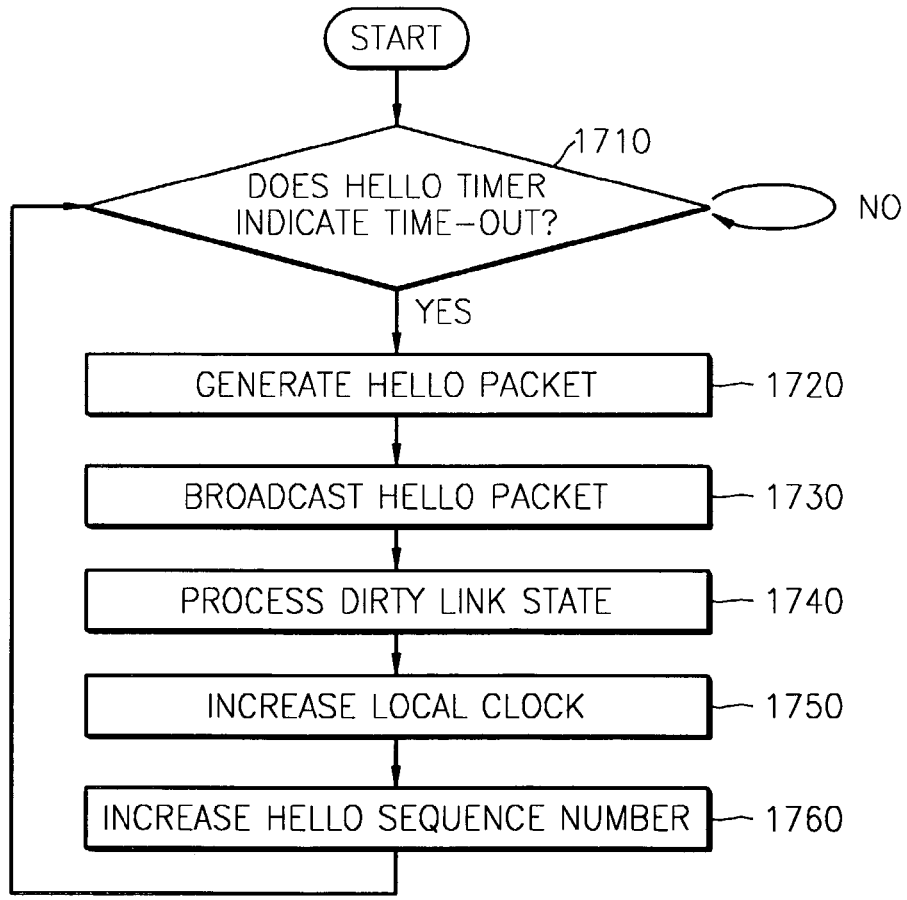

FIG. 29

(K) → STORE LINK STATE OF RECEIVED LINK STATE PACKET — 2910

→ FORWARD RECEIVED LINK STATE PACKET TO NEIGHBORING NODE — 2920

→ STOP

FIG. 30

| | LINK | STATE | |
|---|---|---|---|
| 3010 | NODE 0–NODE 1 | UP | |
| 3020 | NODE 0–NODE 2 | UP | |
| 3030 | NODE 1–NODE 2 | UP | |
| 3040 | NODE 2–NODE 3 | (UP) | → (DOWN) |
| 3050 | NODE 3–NODE 4 | (UP) | → (DOWN) |
| 3060 | NODE 3–NODE 5 | (UP) | → (DOWN) |

LINK STATE SYNCHRONIZATION METHOD AND APPARATUS ON AD-HOC NETWORK, AND DATA STRUCTURE THEREFOR

BACKGROUND OF THE INVENTION

1. Field of the Invention

The present invention relates to a method for link state synchronization on a small-sized ad-hoc network, a method for checking a link state with a neighboring node, a method for processing a disconnected link state, a method for managing a link state, a method for processing link state error information, and an apparatus and a data structure therefor. This Application claims priority from Korean Patent Application No. 2002-46807, filed Aug. 8, 2002, incorporated in full herein by reference.

2. Description of the Related Art

As the size of a network terminal decreases, demands of users for connection to a network when they are moving increase, and computing resources of a network terminal itself can perform the function of a router, technologies that can connect local area network terminals are increasingly needed.

An ad-hoc network is a set of wireless mobile hosts that form a temporary network without centralized administration or standardized supporting services. This ad-hoc network transmits a packet from a backbone host or other mobile host, to another mobile host.

An example of a prior art technology for obtaining route information to a destination in this ad-hoc network environment is shown in FIG. 1.

Here, a node means an independent mobile host on an ad-hoc network. The network shown in FIG. 1 includes node 0 60, node 1 10, node 2 20, node 3 30, node 4 40, and node 5 50. In order to provide information on the link state of each node, a routing table containing information on all link states is flooded (broadcast to many nodes of the network) such that overheads due to the capacity of the routing table occur.

Also, in the prior art, for example, when a link between node 2 and node 3 is disconnected, information only on the disconnection of the node 2 and node 3 is flooded. At this time, node 0 cannot be connected to node 4 and node 5 as well as node 3. However, since node 0 receives information only on the disconnection of node 2 and node 3, node 0 may uselessly try to access node 4 or node 5.

SUMMARY OF THE INVENTION

To solve the above problems, it is an objective of the present invention to provide a link state synchronization method and apparatus for quickly synchronizing a link state without overhead in a small-sized network environment, and a data structure therefor.

To solve the above problems, it is another objective of the present invention to provide a link state synchronization method by which nodes can be stably connected in a small-sized ad-hoc network, and a management method, and an apparatus, and a data structure therefor.

According to an aspect of the present invention, there is provided a method for synchronizing a link state in an ad-hoc network environment, the method comprising each node broadcasting link state information indicating the state of a link connected directly to the node, to a neighboring node; and the neighboring node receiving the link state information, storing the received link state information and broadcasting the link state information to another neighboring node.

It is preferable that the link state information includes information on a source node, a destination node, and the link state of the source node and destination node.

It is preferable that the link state information further includes a sequence number of the link state information and the method further comprises discarding received link state information if link state information containing the same sequence number is received again.

It is preferable that the method further comprises transmitting correct link state information of the present node with information indicating urgent necessity of transmission, to the neighboring node if link state information on the present node is received from a neighboring node and the received link state of the present node is not correct.

According to another aspect of the present invention, there is provided a method for synchronizing a link state in an ad-hoc network environment, the method comprising requesting link state synchronization by transmitting a link state information list of nodes on the network that the present node has, to a neighboring node; receiving a link state information list which the neighboring node that receives the link state information list transmitted by the present node has; and modifying the link state information list of the present node by referring to the received link state information list of the neighboring node.

It is preferable that the modifying step comprises if the link state information list of the neighboring node has a link state that the present node does not have, adding the link state to the link state information list of the present node; and if a link state in the link state information list of the neighboring node is different from the link state in the link state information list of the present node, modifying the link state as a connection state.

According to another aspect of the present invention, there is provided a method for checking a link state with a neighboring node in an ad-hoc network environment, the method comprising transmitting a hello packet having a first sequence number to the neighboring node; receiving a hello response packet having a second sequence number corresponding to the first sequence number transmitted by the neighboring node; and determining a link state with the neighboring node by referring to the first sequence number and the second sequence number.

It is preferable that the determining step comprises deeming the link state with the neighboring node to be connected if the difference between the first sequence number and the second sequence number is less than a predetermined number; and if the different between the first sequence number and the second sequence number is equal to or greater than the predetermined number, deeming the link state with the neighboring node not to be connected.

According to another aspect of the present invention, there is provided a method for processing disconnected link state in an ad-hoc network environment, the method comprising receiving information indicating that the link state between a first node and a second node is disconnected; and storing information on the disconnection of the link between the first node and the second node and information on the disconnection of the links with all nodes that are disconnected due to the disconnection of the link between the first node and the second node.

According to another aspect of the present invention, there is provided a link state management method in an ad-hoc network environment, the method comprising recording information on the time when the link state information is updated; and setting the link state as disconnected if a predetermined time from the recording time passes without an update of the link state information.

According to another aspect of the present invention, there is provided a method for processing link state error information in an ad-hoc network environment, the method comprising receiving link state information on a link to which the present node is connected; discarding the link state information if the received link state information is incorrect; and broadcasting correct link state information on the link to which the present node is connected, to neighboring nodes.

It is preferable that the correct link state information includes an identifier indicating necessity of urgent transmission of the link state information.

According to another aspect of the present invention, there is provided an apparatus for synchronizing a link state in an ad-hoc network environment, the apparatus comprising a link state processing unit which receives link state information from each node on the network, the link state information on the state of a link to which the node is connected, stores the received link state information, and forwards the link state information to neighboring nodes; and a storage unit which stores the link states.

It is preferable that the link state information includes information on a source node, a destination node, and the link state of the source node and destination node.

It is preferable that the link state information further includes a sequence number of the link state information and the link state processing unit further comprises an error state processing unit which discards received link state information if link state information containing the same sequence number is received again.

It is preferable that the link state processing unit further comprises an error state processing unit transmits correct link state information of the present node with information indicating urgent necessity of transmission, to the neighboring node if link state information on the present node from a neighboring node is received and the received link state of the present node is not correct.

According to another aspect of the present invention, there is provided an apparatus for synchronizing a link state in an ad-hoc network environment, the apparatus comprising a hello function unit which requests link state synchronization by transmitting a link state information list of nodes on the network that the present node has, to a neighboring node; and a link state processing unit which receives a link state information list which the neighboring node that receives the link state information list transmitted by the present node has, and modifies the link state information list of the present node by referring to the received link state information list of the neighboring node.

It is preferable that if the link state information list of the neighboring node has a link state that the present node does not have, the link state processing unit adds the link state to the link state information list of the present node, and if a link state in the link state information list of the neighboring node is different from the link state in the link state information list of the present node, the link state processing unit modifies the link state as a connection state.

According to another aspect of the present invention, there is provided an apparatus for checking a link state with a neighboring node in an ad-hoc network environment, the apparatus comprising a hello function unit which transmits a hello packet having a first sequence number to the neighboring node; and a link state processing unit which receives a hello response packet having a second sequence number corresponding to the first sequence number transmitted by the neighboring node and determines a link state with the neighboring node by referring to the first sequence number and the second sequence number.

It is preferable that the link state processing unit deems the link state with the neighboring node to be connected if the difference between the first proper number and the second proper number is less than a predetermined number, and the link state processing unit deems the link state with the neighboring node not to be connected if the different between the first proper number and the second proper number is equal to or greater than the predetermined number.

According to another aspect of the present invention, there is provided an apparatus for processing disconnected link state in an ad-hoc network environment, the apparatus comprising a link state processing unit which stores information on the disconnection of the links with all nodes that are disconnected due to the disconnection of the link between a first node and a second node, together with information on the disconnection of the link between the first node and the second node when information indicating that the link state between the first node and the second node is disconnected is received.

According to another aspect of the present invention, there is provided a link state management apparatus in an ad-hoc network environment, the apparatus comprising a storage unit which stores link state information and information on the time when the link state information is updated; and a link state processing unit which sets the link state as disconnected if a predetermined time from the recording time passes without an update of the link state information.

According to another aspect of the present invention, there is provided an apparatus for processing link state error information in an ad-hoc network environment, the apparatus comprising an error state processing unit which discards the link state information if the received link state information is incorrect when link state information on a link to which the present node is connected is received; and a link state processing unit which broadcasts correct link state information on the link to which the present node is connected, to neighboring nodes.

It is preferable that the correct link state information includes an identifier indicating necessity of urgent transmission of the link state information.

According to another aspect of the present invention, there is provided a packet data structure for synchronizing a link state in an ad-hoc network environment, the packet data structure comprising an identifier which indicates a source in a link; an identifier which indicates a destination in a link; an identifier which indicates a link state; and an identifier which indicates a sequence number of the link state packet.

According to another aspect of the present invention, there is provided a packet data structure for synchronizing a link state in an ad-hoc network environment, the packet data structure comprising a synchronization packet containing an identifier which indicates a synchronization packet requesting link state synchronization, an identifier which indicates a source node transmitting the synchronization packet, and a link state list that the source node transmitting the synchronization packet has; and a synchronization response packet containing an identifier which indicates a synchronization response packet responding to the synchronization packet, an identifier which indicates a source node transmitting the synchronization response packet, and a link state list that the source node transmitting the synchronization response packet has.

According to another aspect of the present invention, there is provided a packet data structure for checking a link state with a neighboring node in an ad-hoc network environment, the packet data structure comprising a hello packet containing an identifier which indicates a hello packet, an identifier which indicates a sequence node transmitting the hello packet, and an identifier which indicates a sequence number of the hello packet; and a hello response packet containing an identifier which indicates a hello response packet, an identifier which indicates a source node transmitting the hello response packet, and an identifier which indicates a sequence number of the hello response packet.

BRIEF DESCRIPTION OF THE DRAWINGS

The above objects and advantages of the present invention will become more apparent by describing in detail preferred embodiments thereof with reference to the attached drawings, in which:

FIG. 16 is a table explaining the types of tuning parameters used in a method for link state synchronization according to the present invention;

FIG. 17 is a flowchart showing operation of a hello function unit shown in FIG. 8;

FIG. 29 is a flowchart showing operation for applying a link state and performing forwarding;

FIG. 30 is a link state table updated according to the operation for processing an unable-to-arrive link.

DESCRIPTION OF THE PREFERRED EMBODIMENTS

Figure 1:
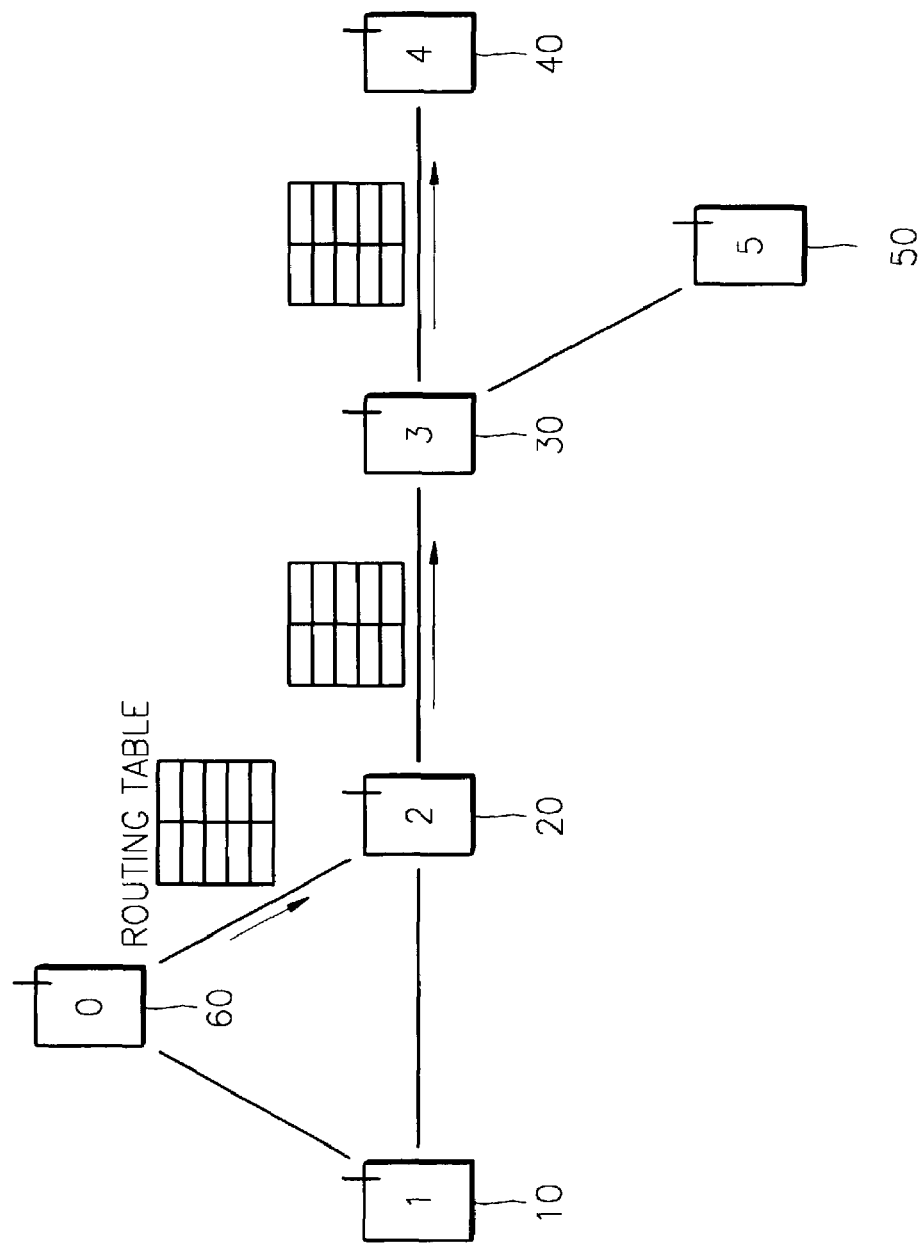
FIG. 1 is a diagram showing a prior art method for link state synchronization on an ad-hoc network.
Figures 2, 3:
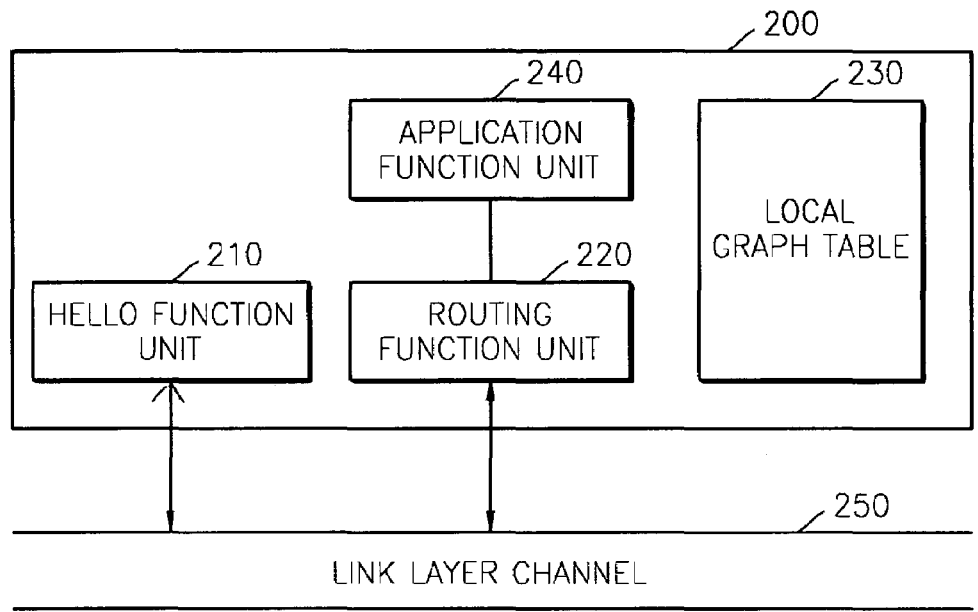
FIG. 2 is a schematic block diagram of the structure of each node according to the present invention.
FIG. 3 is a table explaining packets used in a method for link state synchronization according to the present invention.

FIG. 2 is a schematic block diagram of the structure of each node 200 according to the present invention, the node 200 comprising a hello function unit 210, a routing function unit 220, a local graph table 230, and an application function unit 240.

The hello function unit 210 checks the state of a link to which the node 200 is directly connected, by periodically exchanging packets with neighboring nodes, and also periodically synchronizes link state information with neighboring nodes.

The routing function unit 220 synchronizes the link state of nodes on the network, by processing packets provided by neighboring nodes.

The local graph table 230 stores the link states of nodes and information for maintaining this link states.

The application function unit 240 performs applications provided by a terminal. Detailed structures and functions of respective elements in the node will be explained referring to FIGS. 8 through 31.

Packets used in a synchronization method according to the present invention are shown in FIG. 3.

A hello packet 310 is periodically transmitted to a neighboring node in order to check the state of link connection with the neighboring node. A hello response packet 320 is a packet for responding to the hello packet 310. A link state packet 330 is to carry information on the link state of the present node. A synchronization packet 340 is transmitted to make a request for synchronization with the entire link state information of a neighboring node. A synchronization response packet 350 is a packet for responding to the synchronization request. A data packet 360 is a packet which can be used in applications.

Figure 4:
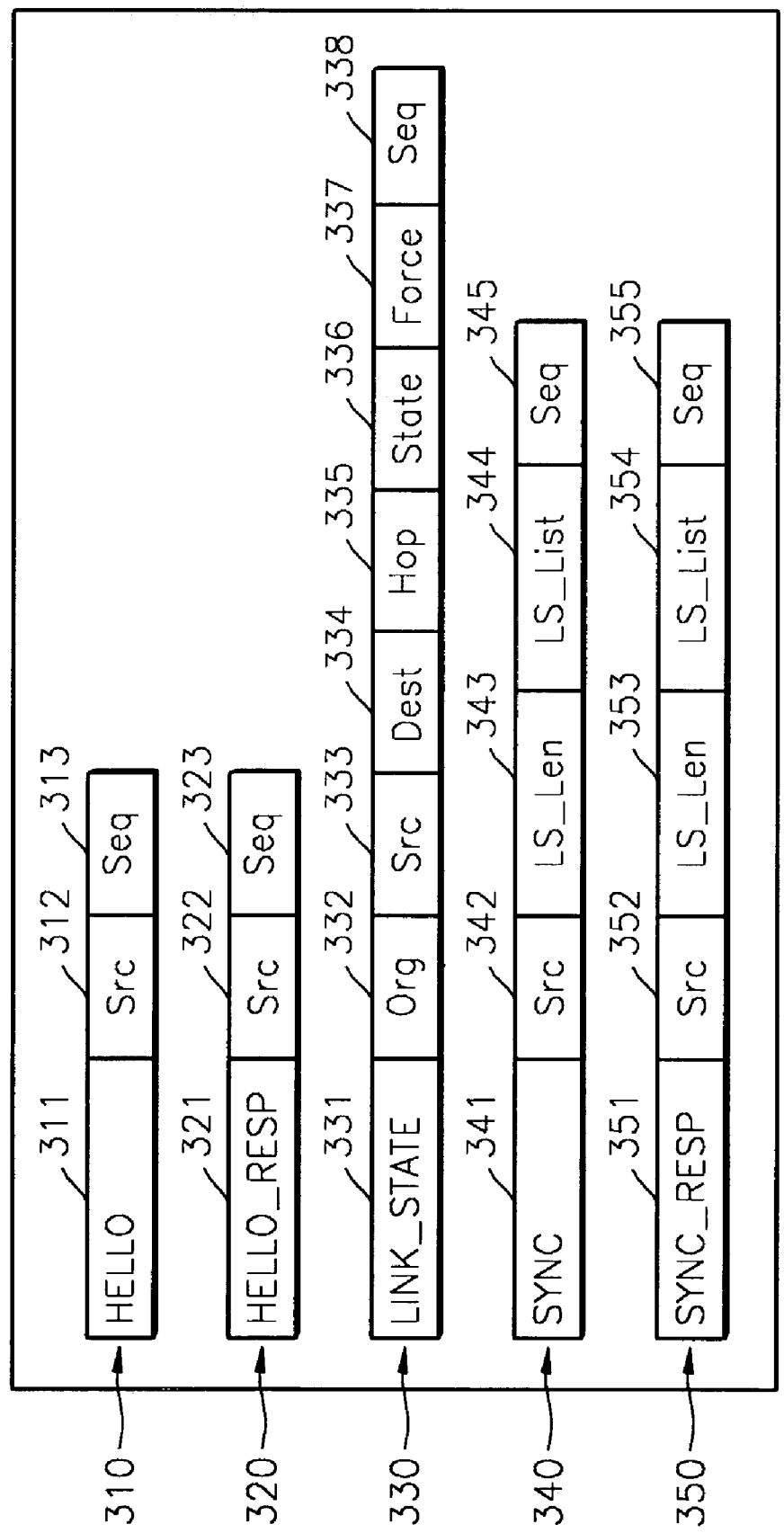
FIG. 4 is a diagram explaining each field of the packet shown in FIG. 3.

The formats of the packets will now be explained referring to FIG. 4.

The hello packet 310 includes HELLO 311, an identifier indicating the packet is a hello packet, Src 312, an identifier indicating a node which transmits the hello packet 310, and Seq 313, a serial number of the hello packet 310. The serial number Seq 313 is an identifier to distinguish the hello packet from other hello packets. Each of the serial numbers increase sequentially.

The hello response packet 320 includes HELLO_RESP 321, an identifier indicating the packet is a hello response packet, Src 322, an identifier indicating a node which transmits the hello response packet 320, and Seq 323, a serial number of the hello response packet 320. The serial number Seq 323 is an identifier to distinguish the hello response packet from other hello response packets and corresponds to the serial number of a received hello packet.

Figure 5:
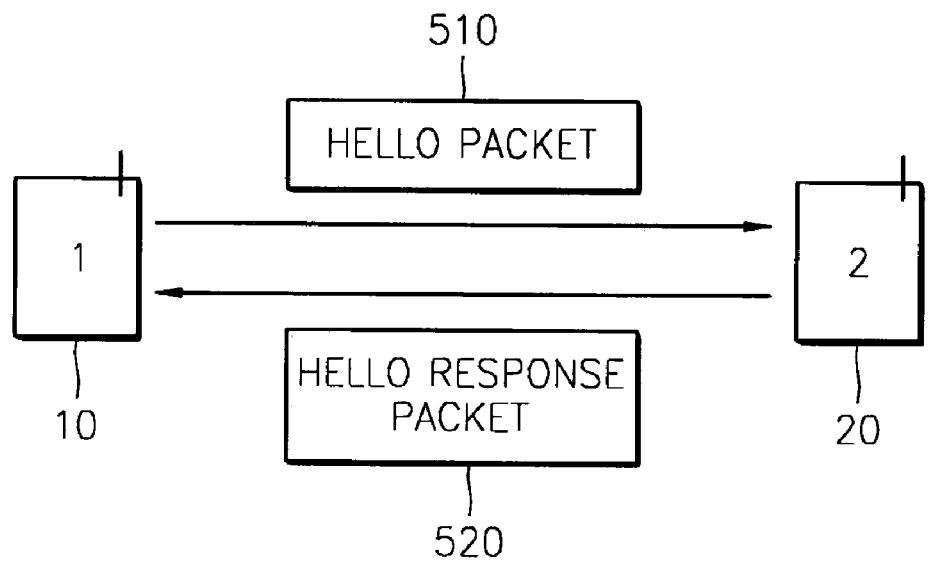
FIG. 5 is a diagram explaining a hello packet used in a method for link state synchronization according to the present invention.

An example of transmission and reception of this hello packet and hello response packet is shown in FIG. 5. When node 1 10 transmits a hello packet 510 to node 2 20, if the link between node 1 10 and node 2 20 is connected, node 2 20 will respond to node 1 10 with a hello response packet 520, and if the link between node 1 10 and node 2 20 is not connected, node 1 10 cannot receive the hello response packet 520 from node 2 20. Even when node 1 10 receives the hello response packet 520 from node 2 20, if the difference of the sequence number 313 of the hello packet 510 transmitted by node 1 10 and the sequence number 323 of the hello response packet 520 received by node 1 10 is large, node 1 10 deems the link between node 1 10 and node 2 20 not connected. In this case, the difference with which a link can be deemed not to be connected may be set as MAX_HELLO_SEQ_DIFF 1630 that is a tuning parameter as shown in FIG. 16.

The link state packet 330 includes LINK_STATE 331, an identifier indicating a link state packet, Org 332, an identifier indicating a node transmitting the link state packet 330, Src 333, an identifier indicating a source node of a link connection, Dest 334, an identifier indicating a destination node of a link connection, Hop 335, an indicator a maximum link transmission frequency, State 336, an indicator the connection state of the source node and the destination node, Force 337, an indicator of a necessity for urgent transmission, and Seq 338, a serial number distinguishing the present link state packet from other link state packets. A serial number is included in the link state packet 330 because a link state packet transmitted by a node may return to the node if the link state packet is broadcast by flooding through a route formed as a loop. Therefore, in this case, the node stores the unique sequence number of a link state packet in advance so that if the link state packet broadcast by the node returns to the node, the node checks the packet broadcast by the node and discards the packet.

Figure 7:
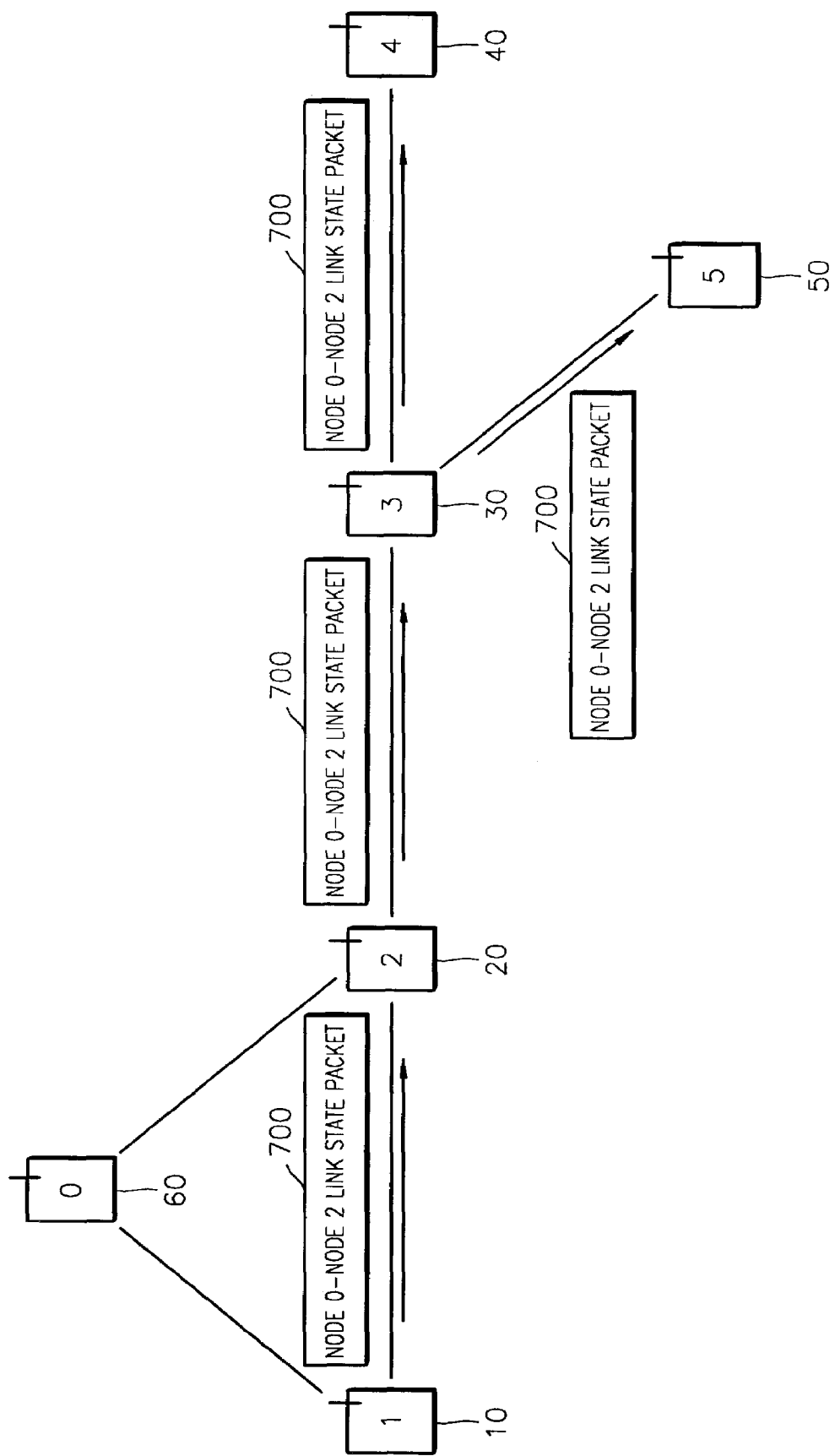
FIG. 7 is a diagram explaining a link state packet used in a method for link state synchronization according to the present invention.

FIG. 7 shows transmission of this link state packet. Node 2 20 floods a link state packet containing information on the link state between node 0 60 and node 2 20, to node 1 10 and node 3 30. Node 3 30 floods the received link state packet without change to node 4 40 and node 5 50. Thus, by flooding its link state, each node on the network informs other nodes of its link state such that the overhead caused by transmitting a huge amount of data contained in a routing table can be reduced.

The synchronization packet 340 includes SYNC 341, an identifier indicating a synchronization packet, Src 342, an identifier indicating a node that transmits the synchronization packet, LS_Len 343, an indicator of the length of a link state list carried on the synchronization packet, LS_List 344, a link state list, and Seq 345, an identifier to distinguish this synchronization packet from other synchronization packets.

The synchronization response packet 350 includes: SYNC_RESP 351 that is an identifier indicating a synchronization response packet, Src 352, an identifier indicating a node that transmits the synchronization response packet, LS_Len 353, an indicator of the length of a link state list carried on the synchronization response packet, LS_List 354, a link state list, and Seq 355, an identifier to distinguish this synchronization response packet from other synchronization response packets.

Figure 6:
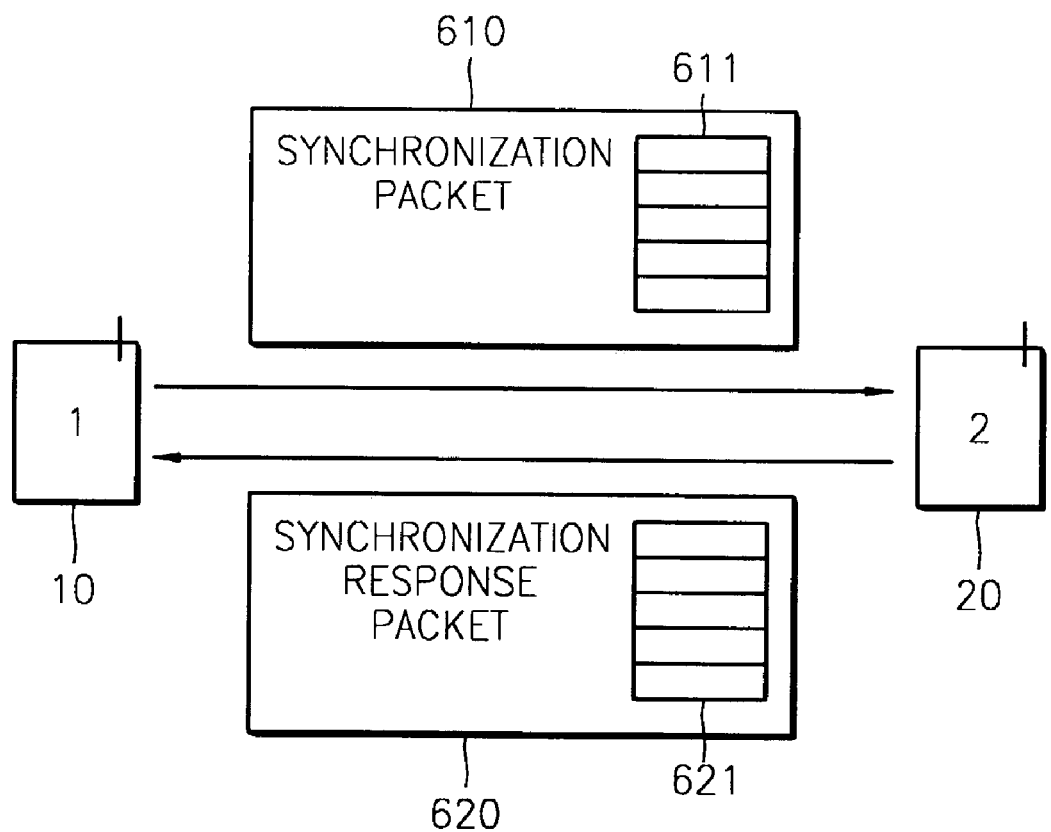
FIG. 6 is a diagram explaining a synchronization packet used in a method for link state synchronization according to the present invention.

An example of transmission and reception of a synchronization packet and synchronization response packet is shown in FIG. 6. If node 1 10 transmits synchronization packet 610 to node 2 20, node 2 responds to node 1 with a synchronization response packet 620. The purposes of the synchronization packet 610 and synchronization response packet 620 is to exchange respective link state information between two neighboring nodes. Accordingly, node 1 loads an entire link state list 611, which node 1 has, on the synchronization packet 610 and transmits the synchronization packet 610. Node 2, receiving the synchronization packet 610 loads an entire link state list 621, which node 2 has, on the synchronization response packet 620 and transmits the synchronization response packet 620.

Figure 8:
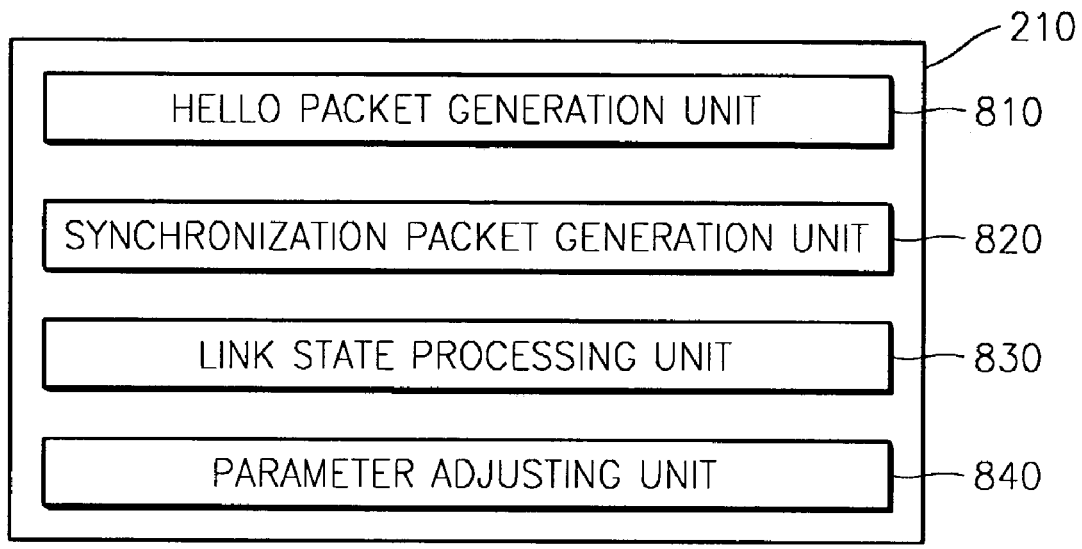
FIG. 8 is a schematic block diagram of the structure of a hello function unit shown in FIG. 2.

FIG. 8 is a schematic diagram of the detailed structure of a hello function unit shown in FIG. 2.

The hello function unit 210 comprises a hello packet generation unit 810, which generates a hello packet, a synchronization packet generation unit 820, which generates a synchronization packet, a link state processing unit 830, which processes a dirty link state, and a parameter adjusting unit 840 which increases a local time and hello sequence number.

Figure 9:
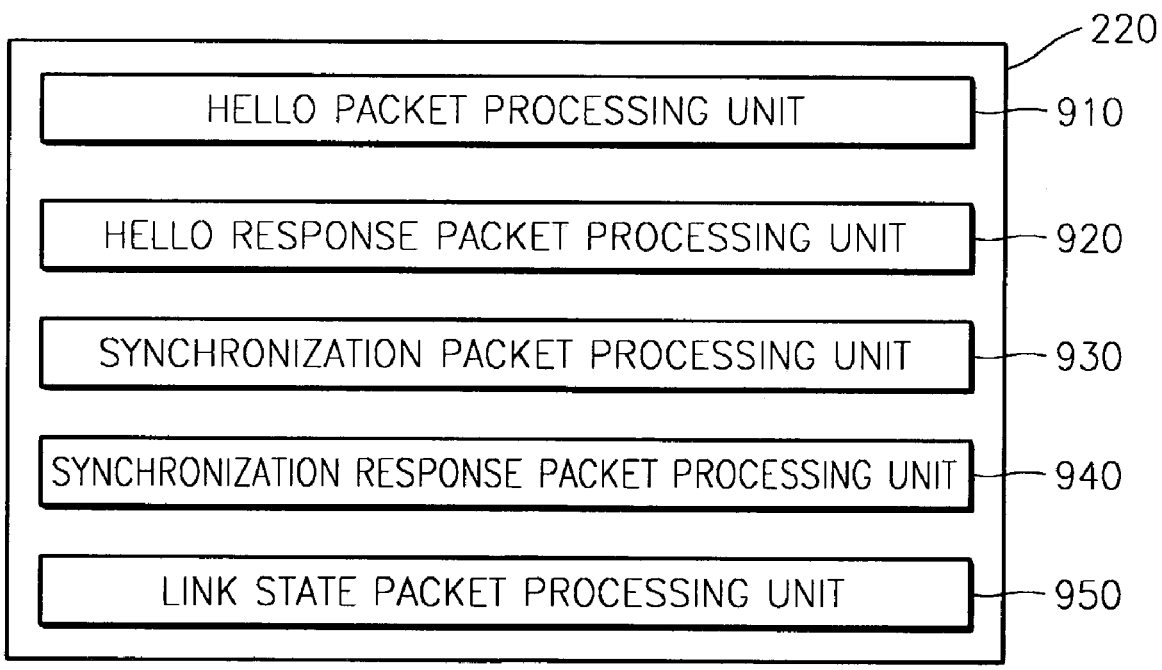
FIG. 9 is a schematic block diagram of the structure of a routing function unit shown in FIG. 2.

FIG. 9 is a schematic diagram of the structure of a routing function unit shown in FIG. 2.

The routing function unit 220 comprises a hello packet processing unit 910, which processes a received hello packet, a hello response packet processing unit 920, which process a hello response packet, a synchronization packet processing unit 930, which processes a synchronization packet, a synchronization response packet processing unit 940 which processes a synchronization response packet, and a link state packet processing unit 950, which processes a link state packet.

Figure 10:
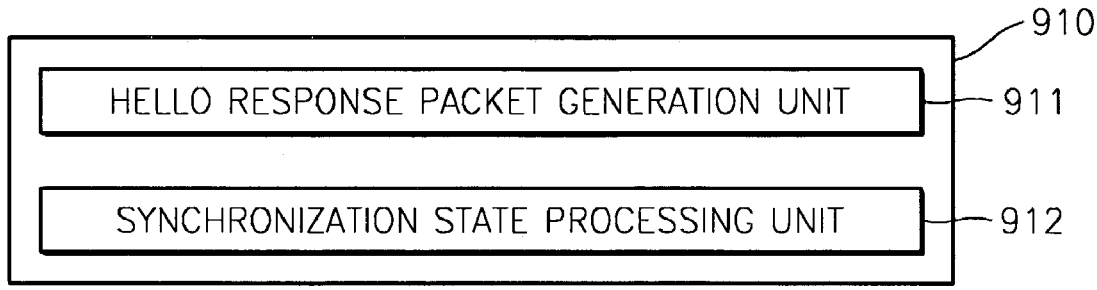
FIG. 10 is a schematic block diagram of the structure of a hello packet processing unit shown in FIG. 9.

Referring to FIG. 10, the hello packet processing unit 910 comprises a hello response packet generation unit 911, which generates a hello response packet, and a synchronization state processing unit 912, which processes a synchronization state by using a synchronization packet at every predetermined cycle of hello packet processing.

Figure 11:
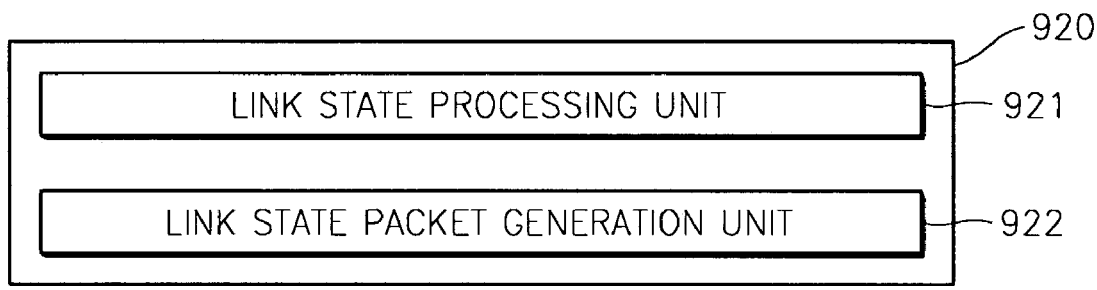
FIG. 11 is a schematic block diagram of the structure of a hello response packet processing unit shown in FIG. 9.

Referring to FIG. 11, the hello response packet processing unit 920 comprises a link state processing unit 921, which sets a link state to "up," and a link state packet generation unit 922, which generates a link state packet.

Figure 12:
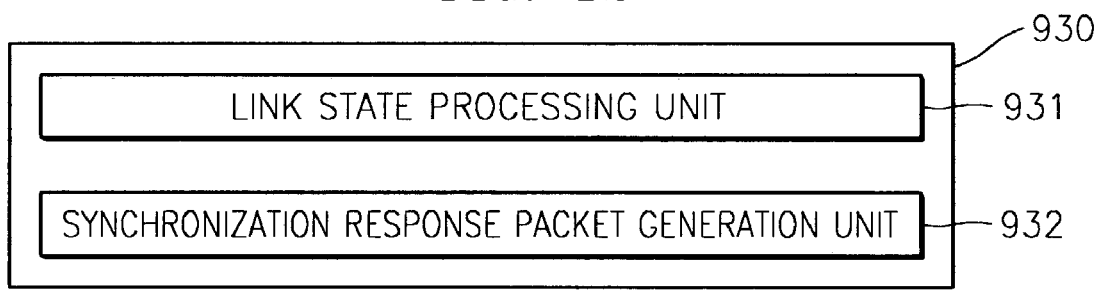
FIG. 12 is a schematic block diagram of the structure of a synchronization packet processing unit shown in FIG. 9.

Referring to FIG. 12, the synchronization packet processing unit 930 comprises a link state processing unit 931 which processes a link state by referring to a received link state list carried by a synchronization packet, and a synchronization response packet generation unit 932, which generates a synchronization response packet for responding to a synchronization packet.

Figure 13:
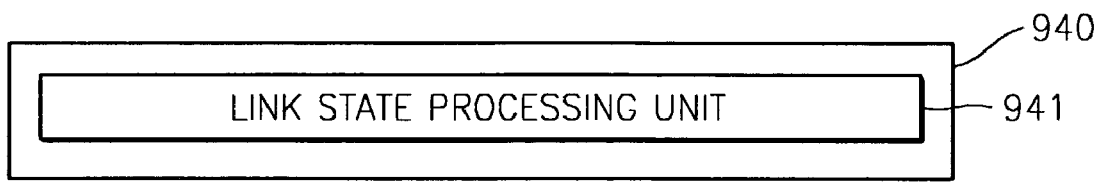
FIG. 13 is a schematic block diagram of the structure of a synchronization response packet processing unit shown in FIG. 9.

Referring to FIG. 13, the synchronization response packet processing unit 940 comprises a link state processing unit 941, which processes a link state by referring to a received link state list which is carried by a synchronization response packet.

Figure 14:
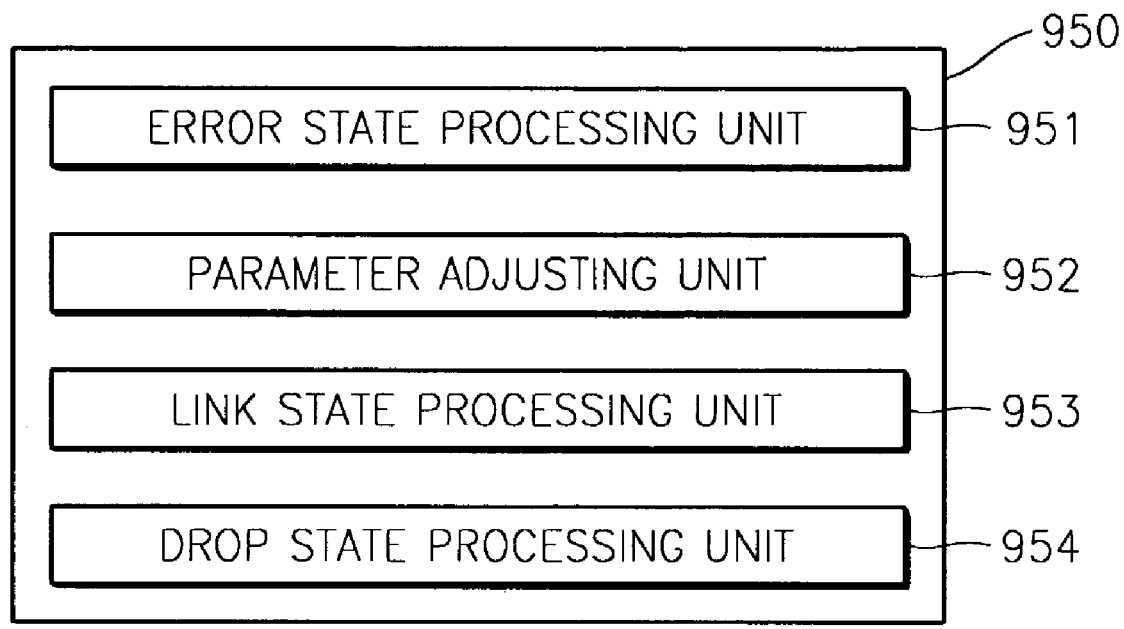
FIG. 14 is a schematic block diagram of the structure of a link state packet processing unit shown in FIG. 9.

Referring to FIG. 14, the link state packet processing unit 950 comprises an error state processing unit 951 for processing an error by checking whether a received link state packet is a link state packet that the present node already has, or a link state packet about the present node, a parameter adjusting unit 952 for updating the time stamp of a received link state, a link state processing unit 953 for applying the received link state to a local graph table and processing an unable-to-arrive link state, and a drop state processing unit 954 for discarding or forwarding according to the number of hops.

Figure 15:
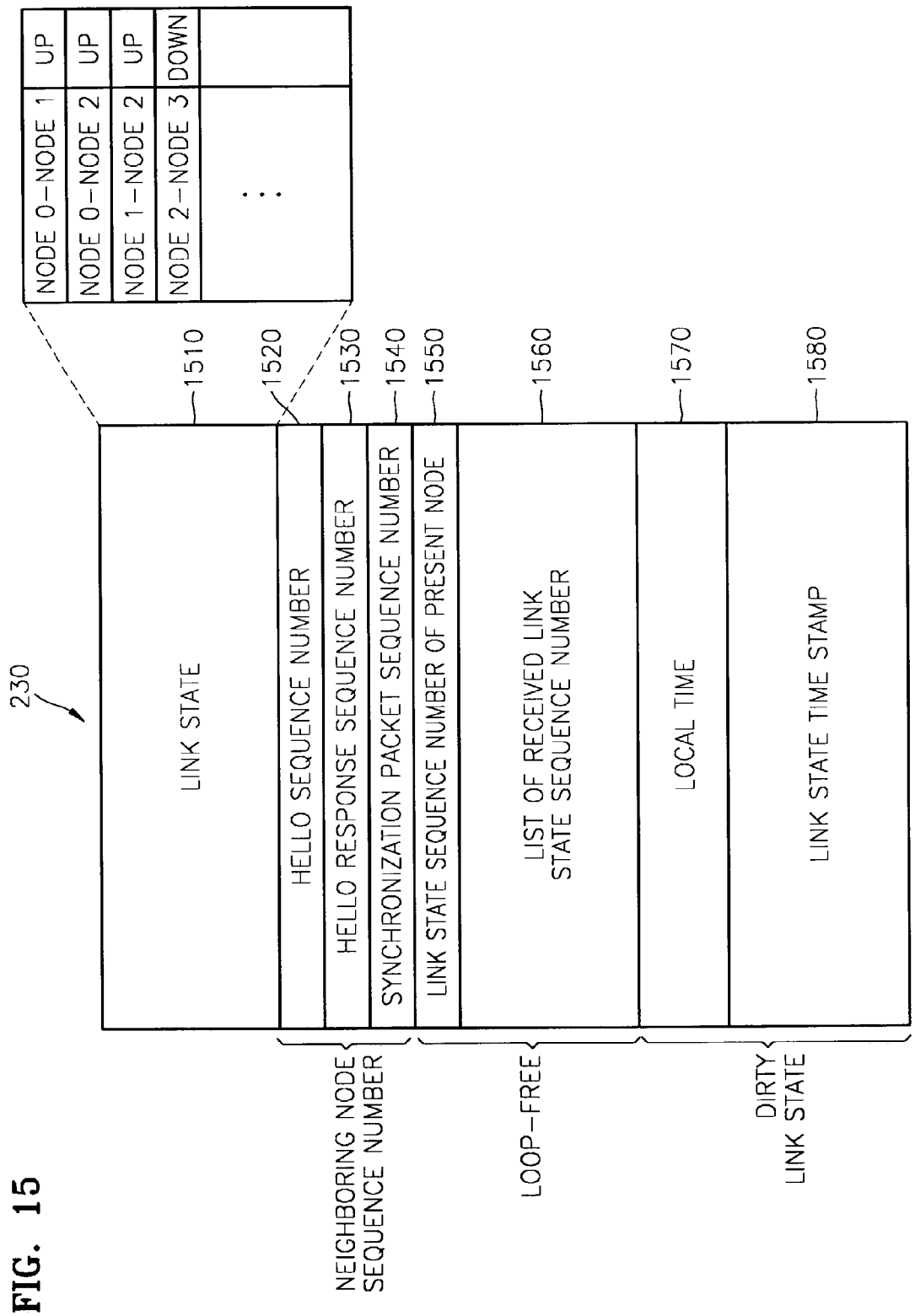
FIG. 15 is a diagram showing the detailed contents of a local graph table shown in FIG. 2.

FIG. 15 is a diagram showing the detailed contents of a local graph table 230 shown in FIG. 2.

The local graph table 230 includes a link state 1510, a hello sequence number 1520, a hello response sequence number 1530, a synchronization packet sequence number 1540, the link state sequence number 1550 of the present node, the list 1560 of a received link state sequence number, a local time 1570, and a link state time stamp 1580.

The link state 1510 is a part for storing the link states of nodes, in which if a link is connected, "up" is stored and if a link is not connected, "down" is stored. The hello sequence number 1520 is the sequence number of a hello packet when the hello packet is transmitted, and the hello response sequence number 1530 is the sequence number of a received hello response packet. With these hello sequence number and hello response sequence number, the connection state with a neighboring node can be indicated. The synchronization packet sequence number 1540 is the sequence number of a synchronization packet which periodically sends a synchronization request.

The link state sequence number 1550 of the present node is a sequence number which is to be loaded when a link state packet is transmitted and is given a unique number. This is to prepare and check a case in which a link state packet which is transmitted by a node returns to the node.

The list of a received link state sequence number stores the ID of a source node and the sequence number of a received link state packet for loop-free operations, that is, in order to prevent an identical link state packet from circulating along a loop by discarding the link state packet when the link state packet is received again.

The local time 1570 stores a time which increases regularly by a local clock. The link state time stamp 1580 indicates the local time when a received link state packet is registered in the local graph table. The local time 1570 and link state time stamp 1580 are for checking a dirty link state. That is, since if a predetermined time passes without an update from a registration time of a link state packet, the accuracy of the link state cannot be guaranteed, the link state is changed to "down" in advance so that the network can be stabilized.

The types of tuning parameters used in a link state synchronization method according to the present invention will now be explained referring to FIG. 16.

MAX_NODE_NUM 1610 indicates the number of maximum nodes that a graph generator can generate, and TMR_HELLO_PERIOD 1620 indicates a time interval for setting the cycle of a hello packet.

MAX_HELLO_SEQ_DIFF 1630 is a maximum hello frequency for sensing on-demand down. For example, if the difference of a transmitted hello sequence number and a received hello response sequence number is greater than 10, the link with the neighboring node is sensed as "down".

MAX_SYNC_SEQ_DIFF 1640 is a hello frequency for setting the cycle of a synchronization packet, and MAX_TS_DIFF 1650 is a maximum permissible time for determining a dirty link state. MAX_FLOOD_HOP 1660 is the maximum number of hops where a flooded link state packet can be forwarded.

FIG. 17 is a flowchart showing operation of the hello function unit 210 shown in FIG. 8.

First, it is checked whether or not a hello timer which shows a time for transmission of a hello packet indicates time-out in step 1710. If the hello timer indicates time-out, a hello packet is generated in step 1720. Next, the generated hello packet is broadcast in step 1730, and a dirty link state is processed in step 1740. That is, if the difference between the link state time stamp 1580 and local time of the local graph table is greater than the tuning parameter MAX_TS_DIFF 1650, the link state 1510 of the local graph table is set to "down".

Then, the local clock increases in step 1750, the hello sequence number increases in step 1760, and the step 1710 is performed again.

Meanwhile, though not shown in the flowchart of FIG. 17, a synchronization packet can be periodically transmitted every predetermined hello time cycles. For example, a synchronization packet can be transmitted whenever five hello packets have been transmitted. For transmission of the synchronization packet, a synchronization packet is generated and then transmitted as the hello packet transmission.

Figure 18:
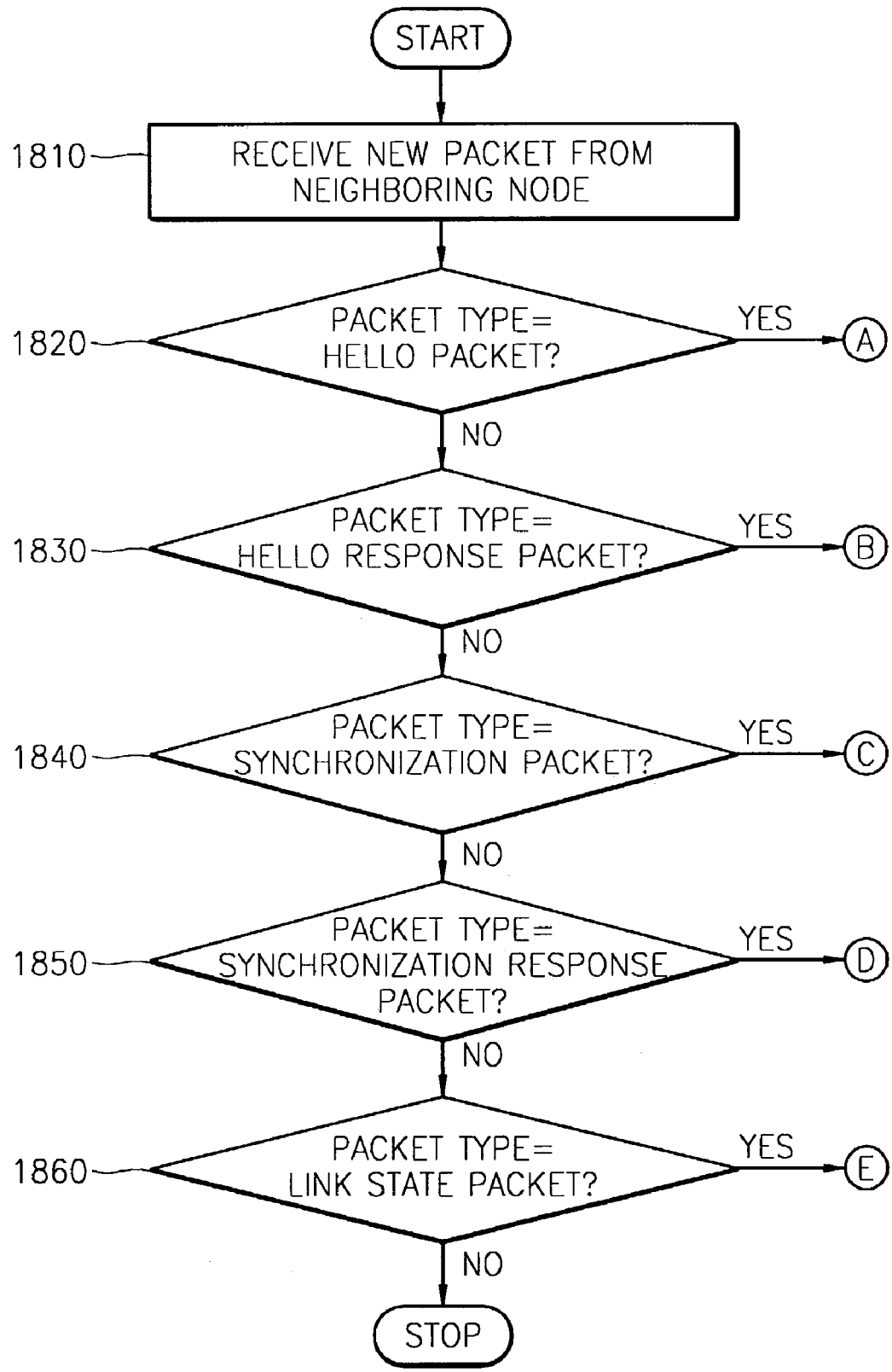
FIG. 18 is a flowchart showing operation of a routing function unit shown in FIG. 9.

FIG. 18 is a flowchart showing operation of a routing function unit shown in FIG. 9. If a new packet from a neighboring node is received in step 1810, each processing unit of the routing function unit processes the received packet according to the type of the received packet.

Figure 19:
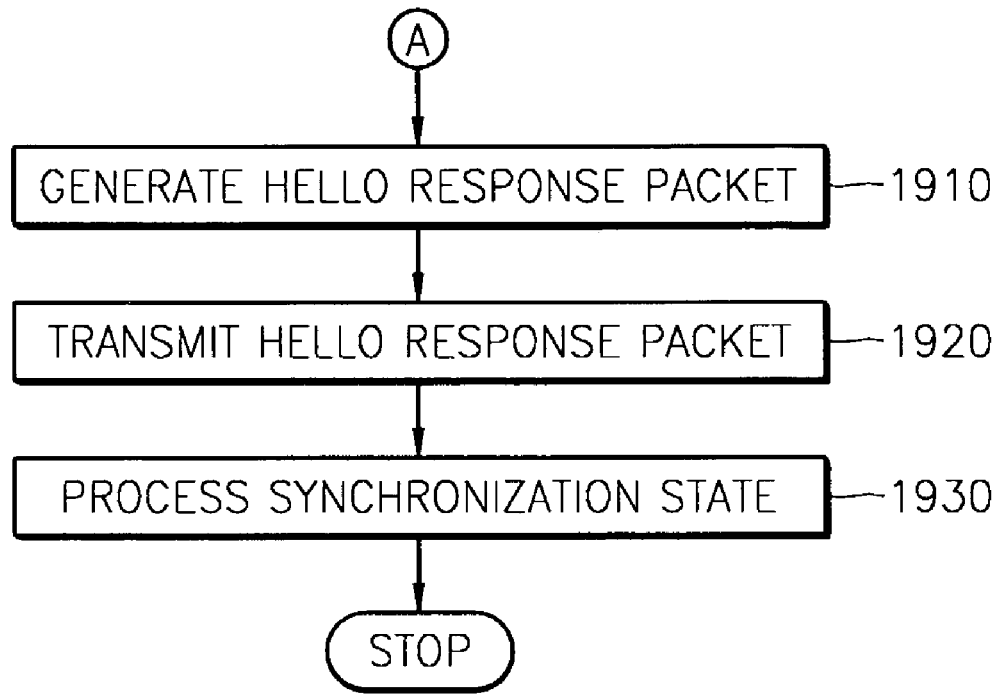
FIG. 19 is a flowchart showing operation of a preferred embodiment of the present invention when a hello packet is received.

FIG. 19 is a flowchart showing the operation of the step 1820 when a hello packet is received.

When a hello packet from a neighboring node is received, the hello response packet generation unit 911 generates a hello response packet in step 1910, and transmits the generated hello response packet to the neighboring node in step 1920. Then, if the node which transmitted the hello packet is a neighboring node that is not registered in the local graph table, the synchronization state processing unit 912 processes a synchronization state, by transmitting a synchronization packet and receiving a synchronization response packet, in step 1930.

Figure 20:
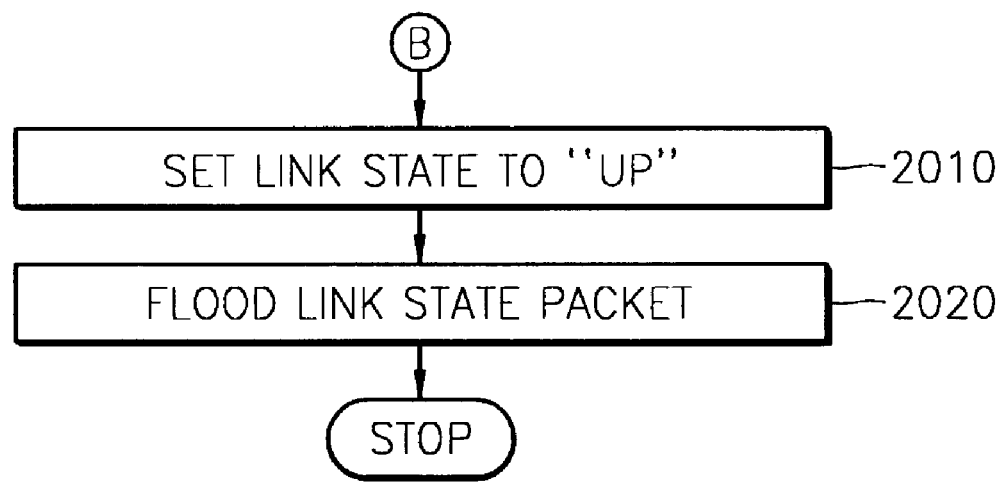
FIG. 20 is a flowchart showing operation of a preferred embodiment of the present invention when a hello response packet is received.

FIG. 20 is a flowchart showing operation of the step 1830 when a hello response packet is received.

If the link state processing unit 921 receives a hello response packet from the neighboring node, this means that the link state processing unit 921 receives from the neighboring node a response to the hello packet that the present node transmitted, and the link between the present node and the neighboring node is connected. Therefore, the link state processing unit 921 sets the link state of the present node and the neighboring node to "up" in the link state list 1510 of the local graph table 230 in step 2010. Then, in order to inform other nodes on the network of the link state of the present node and the neighboring node, the link state packet generation unit 922 floods a link state packet in step 2020.

Figure 21:
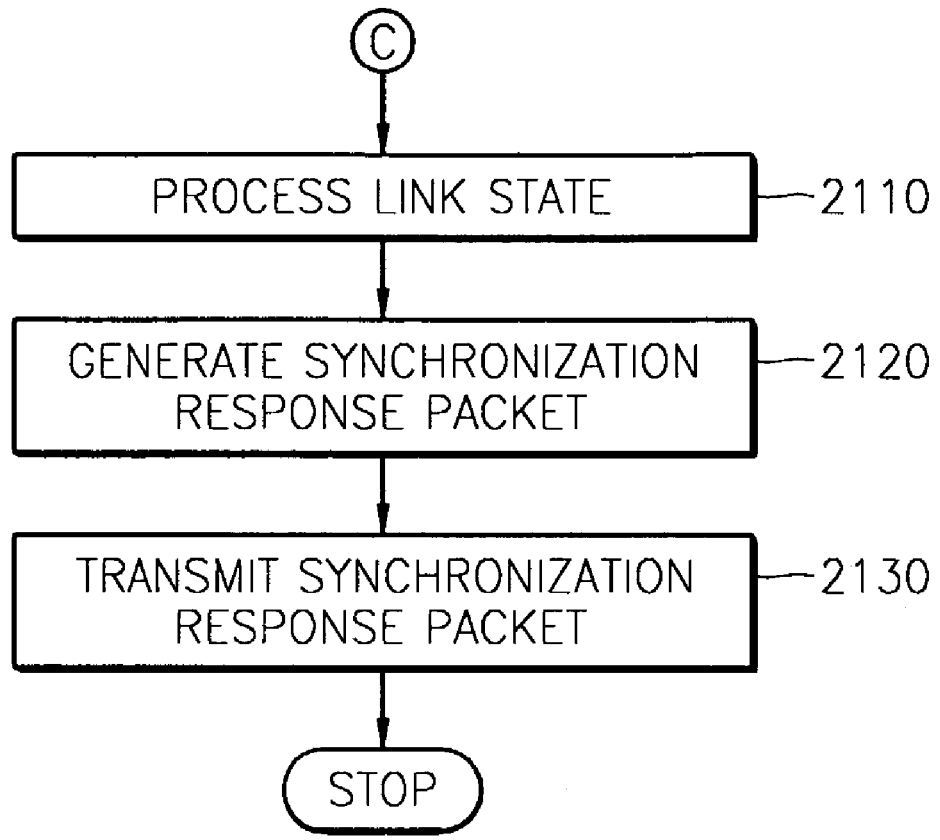
FIG. 21 is a flowchart showing operation of a preferred embodiment of the present invention when a synchronization packet is received.

FIG. 21 is a flowchart showing operation of step 1840 when a synchronization packet is received.

When a synchronization packet from a neighboring node is received, the link state processing unit 921 processes the link state, by comparing the link state list carried on the received synchronization packet with the link state list of the present node in step 2110. That is, if in the received link state list there is a link state that the link state processing unit 921 does not have, the link state processing unit 921 adds the link state to its link state list. If the link state of a predetermined node that the link state processing unit 921 has is different from the link state of the received node, the link state processing unit 921 sets the link state to "up". Then, the synchronization response packet generation unit 932 generates a synchronization response packet in step 2120, and transmits the generated synchronization response packet to the neighboring node in step 2130.

Figure 22:
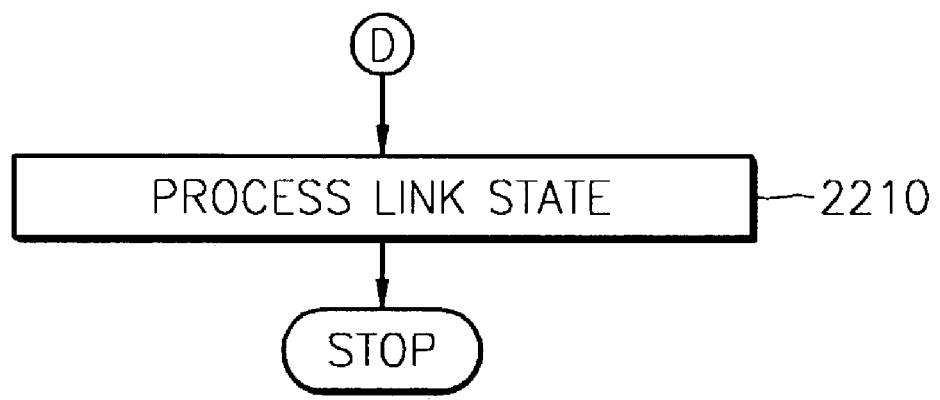
FIG. 22 is a flowchart showing operation of a preferred embodiment of the present invention when a synchronization response packet is received.

FIG. 22 is a flowchart showing operation of the step 1850 when a synchronization response packet is received.

When a synchronization response packet from a neighboring node is received, the link state processing unit 941 processes the link state by comparing the link state list carried on the received synchronization response packet with the link state list of the present node in step 2210 as in the case where the synchronization packet is received.

Figure 23:
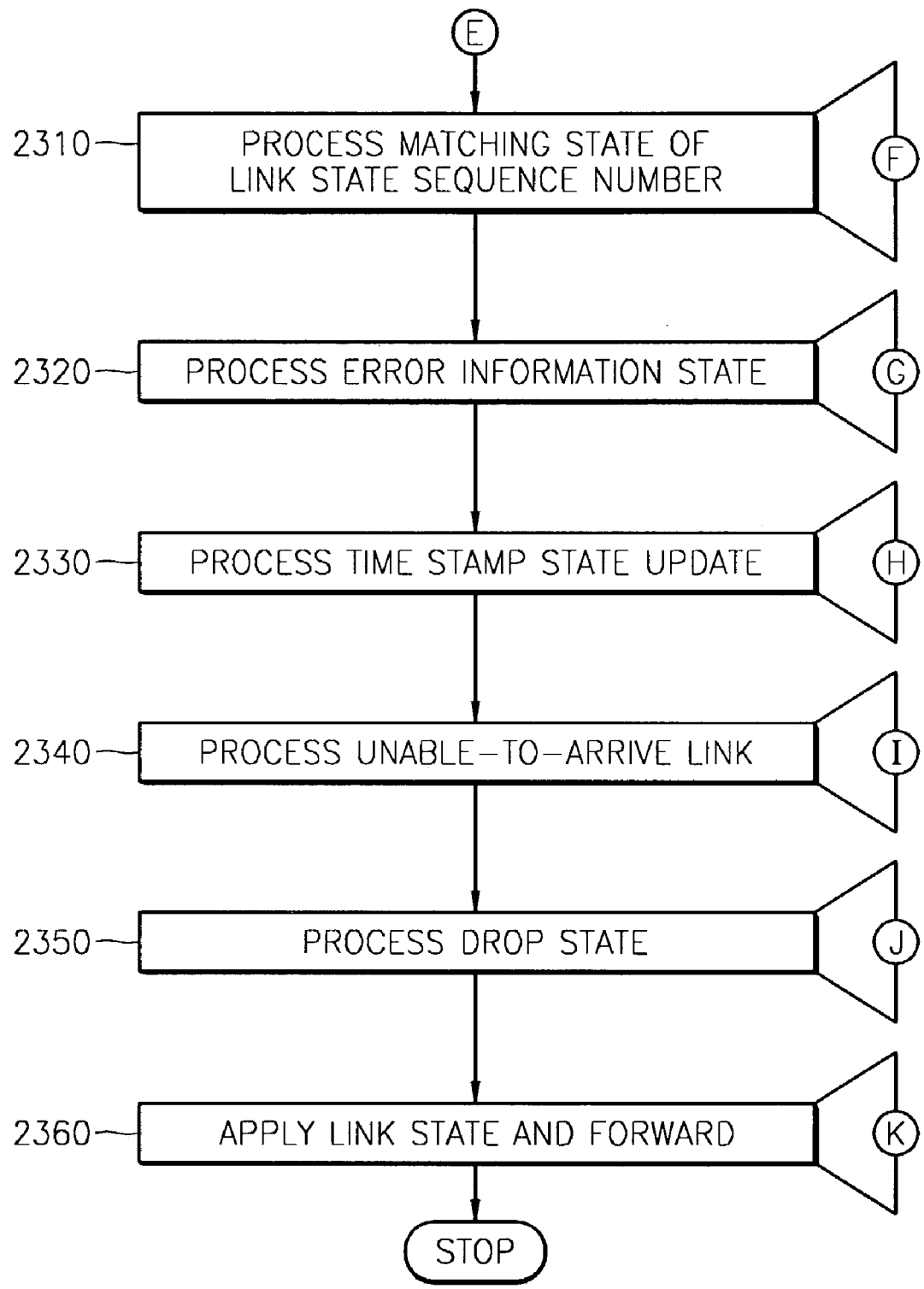
FIG. 23 is a flowchart showing operation of a preferred embodiment of the present invention when a link state packet is received.

FIG. 23 is a flowchart showing operation of the step 1860 when a link state packet is received.

Figure 24:
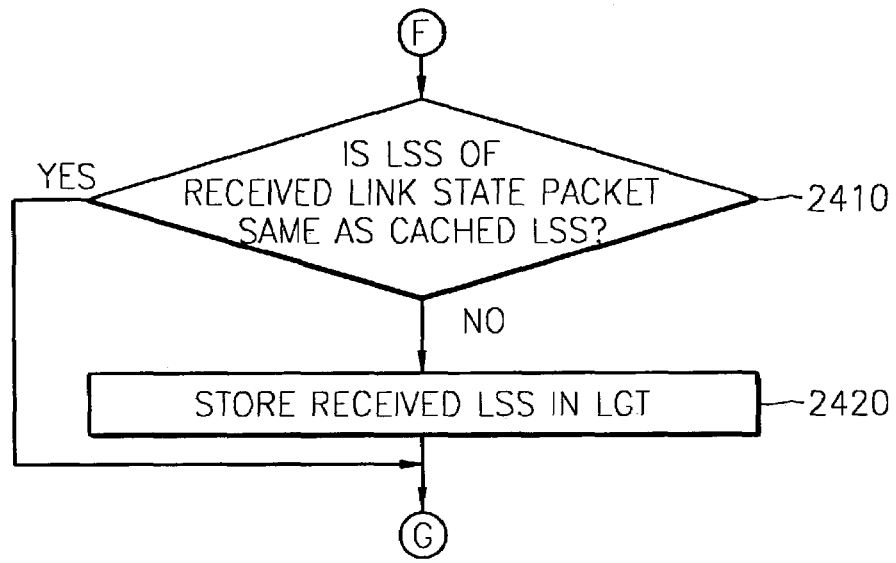
FIG. 24 is a flowchart showing operation for matching state processing of link state sequence number.

When a link state packet from a neighboring node is received, the error state processing unit 951 first processes the matching state of the link state sequence number in step 2310. Referring to FIG. 24, first, it is determined whether or not the sequence number (LLS) of the newly received link state packet is the same as the cached link state sequence number in step 2410. Since whenever a link state packet is received the sequence number of the link state packet is stored in the link state sequence number list 1560 of the local graph table, whether or not a link state packet is previously received can be determined by using the list 1560.

If the result indicates that the numbers are not the same, that is, if the packet is newly received, the received link state sequence number is stored in the local graph table in step 2420.

If the numbers are the same, the received link state packet is discarded and the link state packet processing operation is finished.

Figure 25:
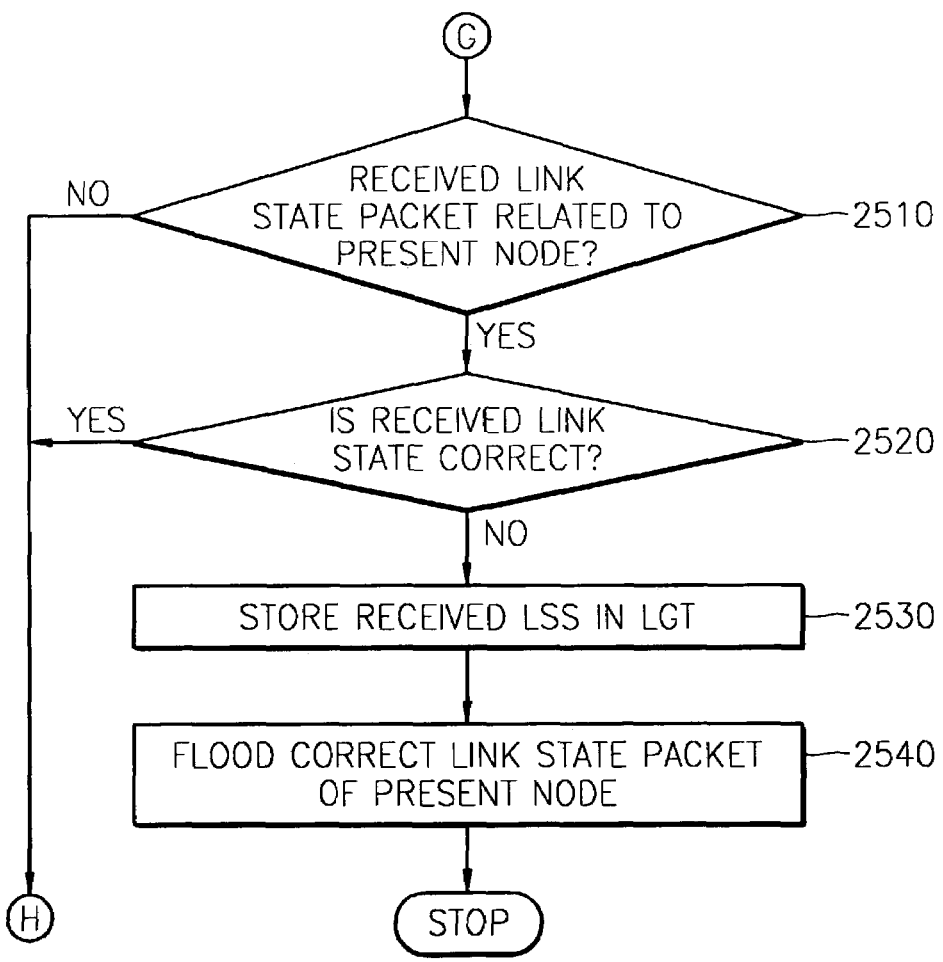
FIG. 25 is a flowchart showing operation for error information state processing.

Next, referring to FIG. 25, processing error information state will now be explained. The error state processing unit 951 checks whether or not its node information is included in the newly received link state packet in step 2510. If the result indicates that its node is included in the packet, whether or not the link state included in the received link state packet is correct is determined in step 2520. The present node knows the link state of the present node, better than other nodes. For example, the present node can check the link state, by referring to the hello sequence number and hello response sequence number of the local graph table. If the checking result indicates that the received link state is not correct, the received link state packet is discarded in step 2530, the correct link state packet of the present node is flooded in step 2540, and all link state packet processing operation is finished. At this time, in the correct link state packet 330 of the present node that is flooded, the Force 337 field is set to "on" and transmitted. If the Force field is set to "on", this is to correct erroneous information of other nodes, and therefore this is urgently processed.

If the received link state packet does not include the present node information, or if the received link state is correct even though the present node is included, time stamp state update processing is performed in step 2330.

Figure 26:
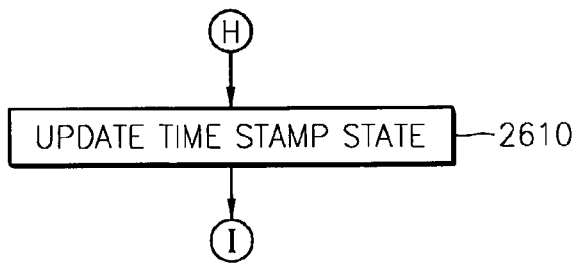
FIG. 26 is a flowchart showing operation for time stamp state update processing.

Referring to FIG. 26, the parameter adjusting unit 952 updates the link state time stamp 1580 in the local graph table in step 2610. Whenever a link state packet is received, the link state is stored. If a predetermined time passes from the time when the link state is stored, this means that update of the link state has not been made for a long time and it is impossible to check whether or not the link state is still effective. Therefore, for safer operation, the link state is set to "down". That is, in each link state, a link state time stamp that is a time for which the link state is set is included, and when a link state is newly updated, the time stamp is updated.

Figure 27:
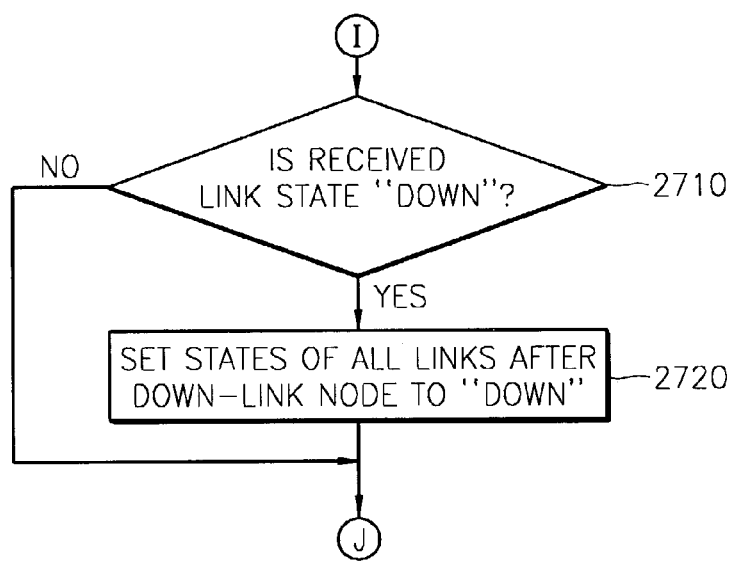
FIG. 27 is a flowchart showing operation for processing an unable-to-arrive link.
Figure 31:
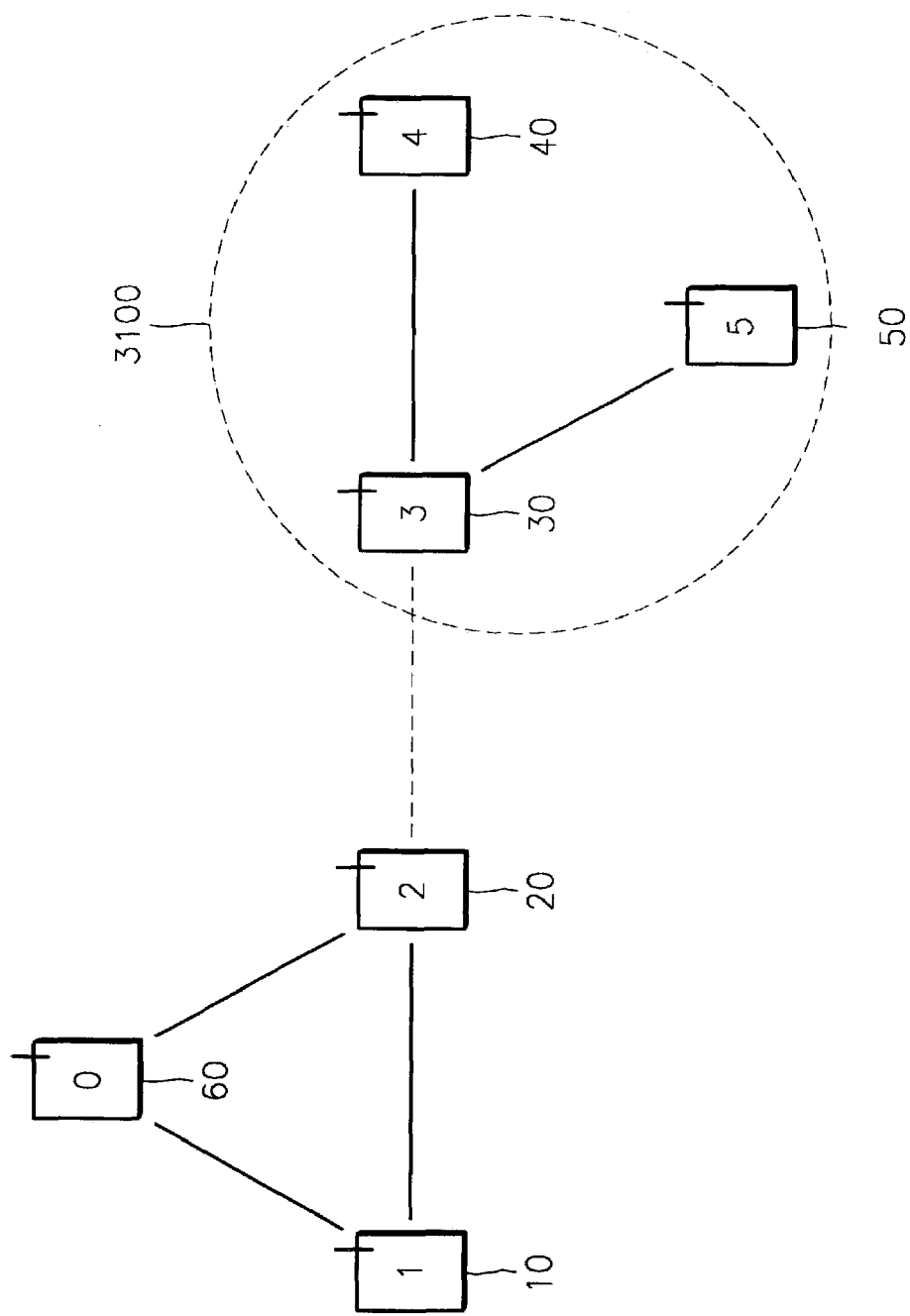
FIG. 31 is a diagram showing a link state for explaining operation for processing an unable-to-arrive link.

Referring to FIG. 27, the unable-to-arrive link processing will now be explained. First, it is determined whether or not the link state of the received link state packet is "down" in step 2710. If the result indicates that the link state is not "down", next step is performed. If the result indicates that the link state is "down", the link state processing unit 953 sets all link states of the nodes after the node whose link state is "down", to "down" in step 2720. For example, as shown in FIG. 31, when node 1 10 receives a link state packet indicating that the link state of node 2 20 and node 3 30 is "down", node 1 10 cannot reach node 4 and node 5 as well as node 3 though the link state between node 3 and node 4 and the link state of node 3 and node 5 are all "up". Therefore, in this case, as shown in FIG. 30, not only the link state 3040 of node 2 and node 3 is set to "down", but also the link state 3050 of node 3 and node 4 and the link state 3060 of node 3 and node 5 are set to "down" so that useless trials to communicate with node 4 or node 5 can be prevented. At this time, a node after the node whose link is "down" can be found by a well-known algorithm.

Figure 28:
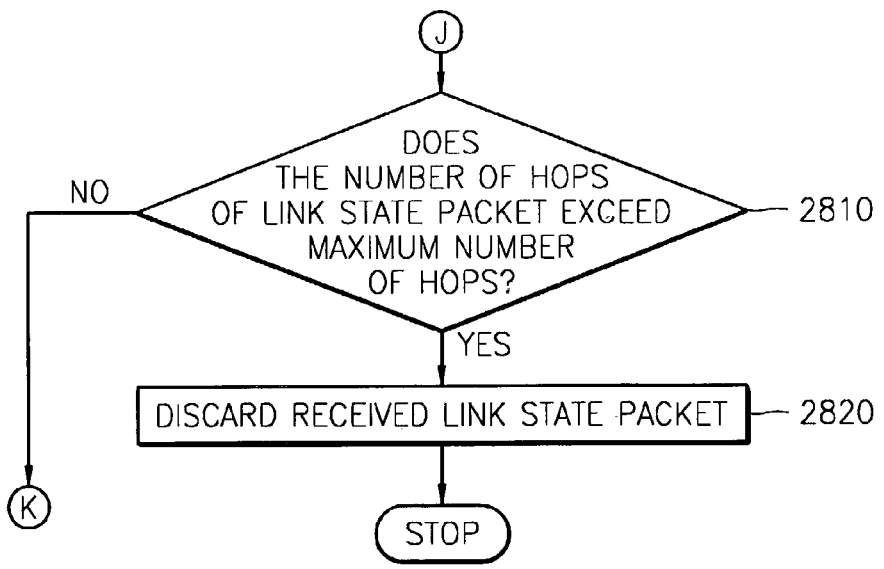
FIG. 28 is a flowchart showing operation for drop state processing.

Referring to FIG. 28, drop state processing 2350 will now be explained.

The drop state processing unit 954 determines whether or not the absorption of the received link state packet exceeds the maximum number of hops in step 2810. If the result indicates that it does not exceed the maximum absorption, the next step is performed. If the result indicates that it exceeds the maximum number of hops, the received link state packet is discarded in step 2820. This is to prevent forwarding more link state packets.

Next, link state applying and forwarding processing 2360 will be explained referring to FIG. 29. The link state of the received link state packet is stored in the link state list of the local graph table in step 2910 and the received link state packet is forwarded to neighboring nodes in step 2920.

As described above, each node synchronizes the link state by forwarding the link state of the node. By doing so, a variety network terminals with emphasized mobility in a small-sized network environment can quickly respond to changing situations, and with reduced overhead, the link state can be synchronized.

Also, using a synchronization packet, link state between neighboring nodes is periodically synchronized. The states of links that a present node cannot reach are deemed to be disconnected as the disconnected link states and the link state that has no update for a predetermined time is periodically set to be disconnected. By doing so, nodes can be connected more stably.

What is claimed is:

1. A method of synchronizing a link state in an ad-hoc network environment, the method comprising:

requesting link state synchronization by transmitting to a neighboring node a link state information list of nodes of the network, wherein a requesting node already has the link state information list;

receiving a link state information list which the neighboring node that receives the link state information list transmitted by the requesting node, already has; and modifying the link state information list of the requesting node by referring to the received link state information list of the neighboring node, wherein the modifying step comprises:

if the link state information list of the neighboring node has a link state that the requesting node does not have, adding the link state to the link state information list of the requesting node; and if a link state in the link state information list of the neighboring node is different from the link state in the link state information list of the requesting node, modifying the link state as a connection state.

2. A method of checking a link state with a neighboring node in an ad-hoc network environment, the method comprising:

transmitting a hello packet having a first sequence number to the neighboring node;

receiving a hello response packet having a second sequence number corresponding to the first sequence number transmitted by the neighboring node; and determining a link state with the neighboring node by referring to the first sequence number and the second sequence number, wherein the determining step comprises:

if the difference between the first sequence number and the second sequence number is less than a predetermined number, deeming the link state with the neighboring node to be connected; and if the difference between the first sequence number and the second sequence number is equal to or greater than the predetermined number, deeming the link state with the neighboring node not to be connected.

3. A link state synchronization apparatus in an ad-hoc network environment, the apparatus comprising:

a hello function unit which requests link state synchronization by transmitting to a neighboring node a link state information list of nodes on the network, wherein a first node already has the link state information list; and a link state processing unit which receives a link state information list which the neighboring node that receives the link state information list transmitted by the first node, already has, and modifies the link state information list of the first node by referring to the received link state information list of the neighboring node, wherein if the link state information list of the neighboring node has a link state that the first node does not have, the link state processing unit adds the link state to the link state information list of the first node, and if a link state in the link state information list of the neighboring node is different from the link state in the link state information list of the first node, the link state processing unit modifies the link state as a connection state.

4. A link state checking apparatus configured to check a link state with a neighboring node in an ad-hoc network environment, the apparatus comprising:

a hello function unit which transmits a hello packet having a first sequence number to the neighboring node; and a link state processing unit which receives a hello response packet having a second sequence number corresponding to the first sequence number transmitted by the neighboring node and determines a link state with the neighboring node by referring to the first sequence number and the second sequence number, wherein the link state processing unit deems the link state with the neighboring node to. be connected if the difference between the first sequence number and the second sequence number is less than a predetermined number, and the link state processing unit deems the link state with the neighboring node not to be connected if the difference between the first sequence number and the second sequence number is equal to or greater than the predetermined number.

* * * * *